United States Patent Office 3,196,137
Patented July 20, 1965

3,196,137
POLYMERIZATION CATALYSTS AND PROCESS
Alfred R. Cain, Akron, Ohio, assignor to The Firestone Tire & Rubber Company, Akron, Ohio, a corporation of Ohio
No Drawing. Filed June 23, 1961, Ser. No. 126,788
9 Claims. (Cl. 260—93.7)

This invention relates to the polymerization of ethylenically unsaturated compounds to produce products having a high degree of stereoregularity. The invention also relates to certain novel catalysts for use in carrying out such polymerizations.

Over the last few years there have been developed a number of polymerization catalysts comprising mixtures of powerful reducing agents with heavy metal salts. These catalysts have enjoyed a considerable measure of success because they make possible the polymerization of olefinic materials at much lower pressures than has heretofore been possible and also, depending upon the specific nature of the catalyst, influence the steric configuration of the polymer chains produced. More particularly with regard to the structure of the polymers, the alpha-olefins higher than ethylene are capable of special types of stereoregularity, depending on the disposition of the alkyl side chains on one side or the other of the main hydrocarbon backbone. Regular patterns of distribution of these chains result in polymers having a highly crystalline structure, which structure is reflected in high melting points, strength, hardness and toughness of these polymers, which render them very suitable for the fabrication of molded, rigid articles. The catalysts of the types mentioned above, while they are capable of producing such crystalline polymers, unfortunately also simultaneosuly produce non-crystalline polymers which are of rubbery character. If these rubbery polymers are produced to any substantial extent, they must be separated by an extractive procedure from the product as a whole, and this constitutes an added step and economic disadvantage in the process, since there is at present no ready market for the rubbery polymers. Likewise it would be desirable to increase the speed of the polymerizations catalyzed by these catalysts and also to increase the amount of monomers which a given amount of catalyst is capable of polymerizing before it becomes exhausted.

Accordingly it is an object of this invention to provide novel catalysts of the type based upon powerful reducing agents and heavy metal salts hereinabove refered to.

Another object is to provide such catalysts which will yield higher proportions of the more desirable crystalline polymers of higher alpha-olefins.

A further object is to provide such catalysts which will provide a greater yield of polymerized material per unit of space and reactor time.

A still further object is to provide such catalysts which will convert greater quantities of olefinic materials to the polymeric form per unit of weight of the catalyst before exhaustion of the catalysts.

Still further objects will appear from the discussion and experimental work appearing hereinbelow.

SYNOPSIS OF THE INVENTION

The above and other objects are secured in acordance with this invention by the addition, to catalysts comprising (A) strong reducing compounds plus (B) heavy metal salts discussed above, of (C) hydrocarbonaminated silicon or titanium compounds in which hydrocarbonamino groups are attached directly to atoms of silicon or titanium by means of a silicon- or titanium-nitrogen bond. As compared to otherwise identical catalysts not containing the hydrocarbonaminated silicon or titanium compounds, the catalysts employed in this invention, when used to polymerize propylene and higher alkyl olefins, result in a conversion of the monomers to greater proportions of crystalline polymers. Moreover the catalysts of this invention are more efficient than comparable catalysts of the prior art in that they produce more polymer (a) per unit of time and reactor space, and also (b) per unit weight of catalysts before exhaustion of the catalysts.

(A) *The reducing agent components of the catalysts*

These may be any reducing substances which, under the conditions prevailing in the polymerization reactors (i.e. essentially hydrocarbon media at temperatures on the order of −100° C. to +150° C.) undergo transformations having a reducing potential of +0.5 electron volt or greater. Such substances are for instance the free metals such as zinc and metals above zinc in the electromotive force series, for instance, aluminum, magnesium, tin and the alkali metals such as lithium, sodium, potassium and so forth. The most common reducing agents used are organometallic compounds, since they are more readily reactive in organic media with the heavy metal salts. The organometallic compounds which have been used in this connection may be summarized briefly as organometallic compounds of any of the metals of groups IA, IIA, IIB, IIIA, IVB and boron which have at least one hydrocarbon group attached to the metal atom via a bond from the metal atom to a carbon atom. The remaining valences, if any, of the metal may be occupied by other hydrocarbon groups or may be connected to halogen, amino, oxo-alkoxy and like non-hydrocarbon radicals. For instance there may be used the simple metal hydrocarbon compounds such as the alkyl, aryl, alkaryl and other hydrocarbon derivatives of the metals noted above, the hydrocarbon groups containing preferably from 1 to 40 carbons each, examples of this type of compound being butyl lithium, phenyl lithium, tetramethylene dilithium, dodecyl lithium, phenyl sodium, phenyl potassium, butyl potassium, diethyl magnesium, diphenyl magnesium, triethyl aluminum, tributyl aluminum, tri-n-hexyl aluminum, tri-n-octyl aluminum, tridodecyl aluminum, methyl ethyl phenyl aluminum, diethyl zinc, dipropyl zinc, diethyl cadmium, tetraethyl tin, tetraphenyl tin, tetramethyl lead, tetraethyl lead tetraphenyl lead, triethyl boron and the like. Also there may be organometallic compounds in which the metal, besides being attached to at least one hydrocarbon group, is also attached to one or more groups other than hydrocarbon, these compounds being Grignard reagents in a broadened sense, for instance ethyl magnesium chloride, ethyl magnesium bromide, phenyl magnesium chloride, diethyl aluminum chloride, dipropyl aluminum chloride, diethyl aluminum sesquichloride, dibutyl aluminum chloride, monoethyl aluminum dichloride and the like. Also there may be used phosphides and nitrides of the above-named metals, for instance sodium phosphide, lithium phosphide, lithium nitride, calcium phosphide, magnesium phosphide and the like. In addition to this it has been found that certain reducing agents not containing metals may be used, such as partially hydrogenated aromatic compounds on the order of tetralin and dihydronaphthalene. Further it has discovered that certain pentahydrocarbon nitrogen, phosphorous, arsenic and antimony compounds of the type descrived in Gilman: "Oganic Chemistry, an Advanced Treatise" 2nd Ed., Vol. I, John Wiley & Sons, Inc. (1943) page 529, last two lines and page 530, lines 1–15, are also operative. In general, these are compounds of the formula
(I)

$R^1R^2R^3R^4R^5Y$ wherein $R^1$, $R^2$, $R^3$, $R^4$ and $R^5$ are hydrocarbon groups containing from 1 to 30 carbon atoms, with the proviso that any pair of $R^1$, $R^2$ etc. may together constitute a single hydrocarbon radical twice bonded to Y, and Y is a group VA element of atomic number less than 83, viz. nitrogen, phosphorus, arsenic or antimony. These compounds include the pentahydrocarbon ammoniums, phosphoniums, arsoniums and stiboniums, answering Formula II, the ylenes answering Formula III and the ylides answering Formula IV as follows, under the same notation.

(II)      $(R^1R^2R^3R^4Y)^+(R^5)^-$ (III) 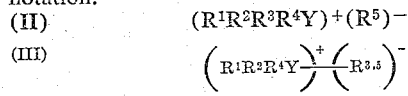

and (IV)      $R^1R^2R^4Y=R^{3,5}$ $R^{3,5}$ indicating a hydrocarbon radical which is twice bonded to the atom Y. Examples of this type of compound are benzyl tetramethyl ammonium, triphenylmethy tetramethyl ammonium, 9-fluorenyl tetramethyl ammonium, benzyl tetrabutyl ammonium, benzl orthoxylylene dimethyl ammonium, dibenzyl trimethyl ammonium, benzyl phenyl trimethyl ammonium, triphenylmethyl ammonium, dibenzyl dimethyl tallow ammonium, benzyl tallow trimethyl ammonium, triphenylmethyl tallow trimethyl ammonium, 9-fluorenyl phenyl trimethyl ammonium, benzyl tetraethyl phosphonium, 9-fluorenyl tetraphenyl phosphonium, 9-fluorenyl tetraphenyl phosphonium, dibenzyl trimethyl phosphonium, benzyl phenyl trimethyl phosphonium, benzyl tetramethyl arsonium, dibenzyl trimethyl arsonium, benzyl phenyl trimethyl arsonium, benzyl tetramethyl stibonium, triphenylmethyl benzyl trimethyl stibonium, and the like. By the term "tallow" it is intended to designate the mixed alkyl radicals present in the alcohols derived by the reduction of the fatty acids produced by hydrolysis of tallow. Examples of ylides and ylenes are compounds of the formula $(CH_3)_3N^+—CH_2^-$, $(CH_3)_2(C_2H_5)N^+—CH^-$, $$(CH_3)_3P=CH_2$$

$(C_6H_5)_3P=CH_2$, and the like. See Eastman Kodak Company "Organic Chemicla Bulletin" Vol. 32 (1960), No. 2, for a discussion of these last types of compounds.

(B) *The heavy metal compounds*

The heavy metal compounds forming the component (B) of the catalysts of this invention are those of the heavy metals, (i.e., those metals embraced by the heavy black lines within the brackets entitled "Heavy Metals" including the lanthanides or rare earth elements Nos. 57–71 in the Periodic Table on pages 54 and 55 of Lange's "Handbook of Chemistry" Fifth Edition, Handbook Publishers, Inc., 1944, or of boron, silicon, arsenic or tellurium. In general the compounds used will be oxides of these metals or salts thereof such as the chlorides, bromides, iodides, acetyl-acetonates, alkoxides or the like, it being understood that the salts need not be simple salts but may be the oxy-salts or salts containing different anions. Specific suitable heavy metal compounds for use in this invention include for instance titanium tetrachloride, zirconium tetrachloride, zirconium acetyl-acetonate, titanium tetrabutoxide, vanadium oxytrichloride, ferric chloride, ferrous chloride, titanium trichloride, antimony pentachloride, bismuth trichloride, titanium dichloride, stannic chloride, cobaltous chloride, antimonyl chloride, tungsten pentachloride, chromium chloride, nickel chloride and the like. Particulary satisfactory results are secured with certain "activated" aluminum-titanium-chlorine-containing preparations produced by heating metallic aluminum with titanium tetrachloride at moderately elevated temperatures on the order of 90° C. in approximately the mol ratio of 3 mols of aluminum tetrachloride to 1 gram-atom of aluminum metal. The reaction product has the empirical formula $Ti_3AlCl_{12}$, and appears to be a true compound of all of these elements, since any excess of titanium tetrachloride may be leached therefrom down to, but not beyond, the composition of the formula given. The simple reaction product prepared as just described should preferably be subjected to an "activation" process, after which it is known as an "activated" preparation and is suitable for use in this invention. The intermediate simple reaction product is subjected to intensive grinding as in a ball mill, edge runner, roll mill, disc mill, impact mill or the like. In general the extent of the grinding should be such that the power consumed in the process will amount to about 3–100 kilowatt hours per gram of material. The function of this grinding is not alone to reduce the particle size, but seems also to develop certain hyperactive, strained, crystal defect areas in the material, as the crystalline X-ray diffraction pattern changes progressively during the grinding. It will be understood that mixtures of heavy metal compounds above indicated as suitable may also be employed.

(C) *The hydrocarbonaminated silicon and titanium compounds*

These may be any compounds wherein one or more alkylamino groups are attached to a silicon or titanium atom by means of a covalent bond from the alkylamino nitrogen atom to the silicon or titanium atom, thus

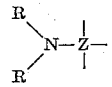

where

R, independently in each occurrence represents a hyrdocarbon group containing 1–20 carbon atoms, and Z is a silicon or titanium atom, the free valences of which may be occupied by other hydrocarbonamino groups or other innocuous groups such as oxo groups, oxygen bridges to other silicon atoms, akyl groups and the like.

One class of such compuonds are the tetrakis-(dihydrocarbonamino) silanes and titaniums of the formula (V) 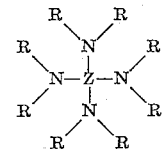

under the above notation. Likewise suitable are the compounds in which the silicon and titanium atoms are linked into chains with oxygen groups as in the siloxanes and corresponding titanium compounds:

VI) 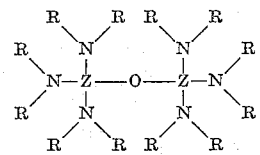

The central silicon or titanium compounds may also be connected to an oxo group thus

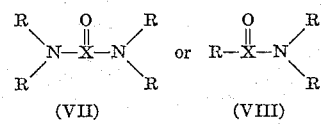

(VII)      (VIII)

Compounds of the above various types are exemplified in tetrakis-(dimethylamino) silane, tetrakis(dimethylamino) silane, tetrakis-(di-n-butylamino) silane, tetrakis-(di-n-dodecylamino) silane, tetrakis-(di-n-octadecylamino) silane, tetrakis-(diphenylamino) silane, tetrakis-(dimethylamino) titanium, tetrakis-(diethylamino) titanium, hexakis-(dimethylamino) siloxane, the corresponding titanium compound $[(CH_3)_2N]_3Ti—O—Ti[(CH_3)_2N]_3$, hexakis-(diethylamino) siloxane, hexakis-(di-dodecylamino) siloxane, tri-(dimethylamino) ethyl silane, tri-(dimethylamino) ethyl titanium, alkylamino silicone polymers, the compound of the formula $$(CH_3)_2N—SiO—N(CH_3)_2$$

and the like.

THE MONOMERIC ETHYLENICALLY UNSATURATED COMPOUNDS

The polymerization method of the invention is applicable to the polymerization of any of the ethylenically unsaturated monomers commonly polymerized, and it is especially applicable to the polymerization of alpha-olefins, which are generally less readily polymerizable than the more polar ethylenically unsaturated monomers. The polymerization of propylene by the method of the invention is especially advantageous, since the polymerization products under preferred conditions possess a high degree of crystallinity. Other mono-olefins suitable for polymerization by the method of the invention include, for example, ethylene, butene-1, isobutylene, pentene-1, hexene-1, 3-ethylhexene-1, octene-1, 2-methylbutene-1, 3-methylbutene-1, 3,3-dimethylbutene-1, 2-methylpentene-1, 3-methylpentene-1, 4-methylpentene1, 3-ethylpentene-1, 4,4-dimethylpentene-1, cyclopentene, cyclohexene, styrene, alpha-methylstyrene, chlorostyrene, divinylbenzene, vinylnaphthalene, and the like. Also amenable to the process of the invention are polyolefinic compounds including, without limitation, butadiene-1,3, isoprene, 2,3-dimethylbutadiene-1,3, piperylene and the like. Likewise the invention can be used to polymerize vinyl and vinyldene monomers including, without limitation vinyl chloride, vinylidene chloride, chlorotrifluoroethylene, the lower alkyl acrylates, the lower alkyl methacrylates, the lower alkyl ethacrylates, vinyl acetate, vinyl propionate, acrylonitrile, methacrylonitrile, vinylpyridines, vinylcarbazole, and the like. The invention can be used to make copolymers or interpolymers of any of the monomers indicated above. Likewise the invention can be utilized to polymerize a prepolymer of partially polymerized compound, with itself or with another ethylenically unsaturated compound.

THE PREPARATION OF THE CATALYSTS AND CONDUCT OF THE POLYMERIZATION REACTION

The catalysts of this invention are prepared by mixing and agitating together (A) the reducing agent plus (B) the heavy metal compound plus (C) the alkylaminated silicon or titanium compound, preferably in a saturated aliphatic or aromatic hydrocarbon vehicle such as petroleum ether, heptane, kerosene, mineral oil, diesel oil, benzene, toluene or the like. In many cases, one or more of the components will be insoluble in the vehicle, in which case it may be advisable to subject the catalyst mass to grinding, as in a ball mill. Also there is some indication that it is desirable to pre-react the heavy metal compound (B) with the alkylaminated silicon or titanium compound (C) for some time during the preparation of the catalyst, withholding the reducing agent (A) until such pre-reaction has taken place. Temperature of mixing may vary within wide limits, usually between —10° C. or lower, say down to —100° C. up to temperatures on the order of 150° C. Preferably the temperature will be in the range 20° C. to 100° C. These temperature ranges apply also to the polymerization reaction proper. As to the relative proportions of the ingredients, usually a sufficient amount of the reducing agent will be used to supply at least .7 mol of the reducing agent for each gram-atom of heavy metal in the heavy metal compound. The upper limit is not critical, and is set mainly by economic considerations of cost of supplying unnecessary reducing agent. It will usually be desirable to operate in the range of 1.0 to 3.0 mols of the reducing agent per gram-atom of heavy metal in the heavy metal compound. As to the amount of the hydrocarbonaminated silicon compounds to be used, very small amounts, say sufficient to provide 0.01 gram-atom of amino nitrogen in the alkylaminated silicon or titanium compound per mol of the reducing agent will exert some beneficial effect. Usually sufficient hydrocarbonaminated compound will be supplied to furnish 0.4 gram-atom of amino nitrogen per mol of reducing agent. Again it will be appreciated that the upper limit will be imposed by economic considerations of supplying unneeded compound, rather than any technical considerations. Usually, not more than sufficient of the hydrocarbonaminated compound will be used than sufficient to provide 5 gram-atoms of amino nitrogen per mol of reducing agent. Other additives designed to enhance the performance of the catalysts and the properties of the polymeric products may be used concurrently with the hydrocarbonaminated silicon and titanium compounds of this invention, for instance hexamethyl phosphoramide. The polymerization is carried out by contacting the monomers with the catalyst, preferably in a saturated liquid hydrocarbon vehicle such as suggested above, preferably with sufficient agitation to insure contact of the catalyst and monomers and to avoid segregation of the product. The amount of vehicle employed sohuld be preferably sufficient to avoid difficulty in agitation during the reaction, i.e. so that the concentration of the final polymer product will be not over about 50%, based on the total weight of polymer plus vehicle. The amount of catalyst should be such that it will reach economic exhaustion at about the same time that the vehicle contains all of the polymer it can carry without difficulty in agitation. Ordinarily it will be expected that each gram of catalyst will produce from 15 to 100 grams of polymer. The polymerization may be carried out batchwise, or in a continuous manner wherein the catalyst (or ingredients thereof), vehicle and monomer are continuously supplied to a reactor system and the resultant polymer solution or dispersion is continuously discharged from the reactor system. The polymeric products are purified by any suitable treatment, as by washing with alcohols, acids, ammonia and the like.

With the foregoing general discussion in mind, there are given herewith detailed examples of the practice of this invention. All parts and percentages are given on the basis of weight, unless the contrary is specifically indicated.

EXAMPLE I

| | |
|---|---|
| Heptane | 250 ml. |
| Propylene | 25 g. |
| Sodium phenyl suspension (1 molar, in benzene) | 1.5–2.0 ml. (.0015 to .002 mol per Table I). |
| Aluminum-titanium-chlorine preparation suspension (Produced by reduction of TiCl₄ with metallic aluminum followed by intensive grinding). "AA" produced by Stauffer Chemical Company—1 molar suspension, in mineral oil) | 2.0 ml. (.002 mol). |
| Hexakis-(dimethylamino) siloxane solution. (1 molar, in Shell Oil Company commercial heptane) | 0.25–0.5 ml. (.00025–.0005 mol per Table I). |

A series of runs was made in accordance with the foregoing recipe, varying the ingredients from run to run as set forth hereinafter in Table I. In each run the heptane was charged into a 28-ounce beverage bottle, which was then flushed with nitrogen and sealed with a neoprene-lined crown cap provided with a perforation for the hypodermic injection of reactants. The bottle was then inverted and placed in a cradle on a balance which was first brought to equilibrium and then over-weighted with a 25-gram weight. Propylene was injected through a conduit and hypodermic needle until the balance was again in equilibrium. The back pressure at this point was about 30 p.s.i.g. The suspension of aluminum-titanium-chlorine preparation and solution of hexakis-(dimethylamino) siloxane were then hypodermically injected and the bottle placed upon a polymerizer wheel which dipped and revolved the bottle in a water bath at 50° C. for 17 hours. The sodium phenyl suspension was then added and the bottle revolved for an additional 96 hours. The pressure was determined hypodermically at 7, 25 and 71 hours after injection of the sodium phenyl suspension. At the end of this time the bottle was removed from the wheel, cooled to 25° C., vented and opened, and the polymer separated from the liquid vehicle by decantation. The solid product was then reslurried in heptane, the slurry poured into methanol and the mixture agitated for 15 minutes. The slurry mixture was then filtered, the cake reslurried and agitated for 15 minutes in methanol containing an antioxidant, refiltered, and the solid resinous product removed from the filter and dried in open air for 24 hours. The yield of solid, resinous product for each run is set forth in Table I.

The liquid decanted from the polymerizer mixture and the filtrate from the reslurrying operation (a two-phase system) was diluted with methanol and then heated to drive off the volatile material, leaving a rubbery polymer. The yield of this rubbery polymer is also set forth for each run in the accompanying Table I.

TABLE I

| Catalyst Ingredients (Millimols) | | Pressure (p.s.i.g.) at the end of— | | | Yield (grams) | | Properties of the Resin | | Run No. |
|---|---|---|---|---|---|---|---|---|---|
| Na phenyl | $Si_2O[N(CH_3)_2]_6$ | 7 hrs. | 25 hrs. | 71 hrs. | Resin | Rubber | Bending Modulus (p.s.i.) | Rockwell R Hardness | |
| 1.5 | 0.25 | 46 | 24 | 11 | 13.5 | 5.6 | 72,200 | 66 | 1 |
| 1.5 | 0.25 | 0 | 0 | 0 | 17.7 | 6.1 | 56,300 | 44 | 2 |
| 1.5 | 0.5 | 48 | 21 | 7 | } 38.3 | 10.9 | 79,000 | 7.3 | 3 |
| 1.5 | 0.5 | 42 | 18 | 6 | (*) | | | | 4 |
| 2.0 | 0.25 | 43 | 17 | 2 | } 35.7 | 11.8 | 71,800 | 67 | 5 |
| 2.0 | 0.25 | 51 | 25 | 8 | (*) | | | | 6 |
| 2.0 | 0.5 | 43 | 18 | 4 | } 39.4 | 10.9 | 88,300 | 74 | 7 |
| 2.0 | 0.5 | 40 | 15 | 4 | (*) | | | | 8 |

*The reaction mass from this run was combined with that of the preceding run as indicated by the bracket, and the two batches worked up together. The yield reported is for the combined batches.

EXAMPLE II

Heptane _____ 250 ml.
Propylene _____ 25 g.
Sodium phenyl suspension _____ 1.0–1.5 ml. (.001–.0015 mol, per Table II).
  (1 molar, in benzene)
Aluminum-titanium-chlorine preparation suspension. 2.0 ml. (.002 mol).
  (Produced by reduction of $TiCl_4$ with metallic aluminum followed by intensive grinding. "AA" produced by the Stauffer Chemical Company—1 molar, suspended in mineral oil)
Tetrakis-(dimethylamino) silane solution. 0.2–0.5 ml. (.0002–.0005 mol, per Table II).
  (1 molar, in Shell Oil Company commercial heptane)

A series of runs was made in accordance with the foregoing recipe, varying the ingredients from run to run as set forth hereinafter in Table II. In each run the heptane and propylene were charged into a bottle as described in Example I, and the aluminum-titanium-chlorine preparation and tetrakis-(dimethylamino) silane were injected hypodermically. The bottle was placed on a polymerizer wheel which revolved in a water bath at 50° C. At the end of two hours the sodium phenyl suspension was hypodermically injected and revolving of the bottle in the bath at 50° C. continued. Within ten minutes after the injection of the sodium phenyl, polymerization appeared to have set in, judged from the sluggish flow of the contents of the bottle. The same conditions were continued for 96 hours, the pressure inside the bottle being determined at 17 and 88 hours after injection of the sodium phenyl suspension. At the end of this time the bottle was opened and the polymer recovered as described in Example I. Set forth herewith in Table II are particulars of the several runs, together with properties of the products.

TABLE II

| Catalyst Ingredients (Millimols) | | Pressure in Bottle (p.s.i.g.) after— | | Yield [2] (grams) | | Properties of the Resin | | | | Run No. |
|---|---|---|---|---|---|---|---|---|---|---|
| Na phenyl | $Si[N(CH_3)_2]_4$ | 17 hrs. | 88 hrs. | Resin | Rubber | Bending Modulus (p.s.i.) | Rockwell R Hardness | Tensile Strength | Elongation (percent) | |
| 1.0 | 0.2 | 42 | 8 | } [1] 48.4 | ------ | 24,200 | ------ | 1375 | 113 | } 1 2 |
| 1.0 | 0.2 | 36 | 6 | | | | | | | |
| 1.0 | 0.2 | 33 | 3 | } [2] 31.5 | 15.7 | 53,400 | 39 | 3375 | 360 | } 3 4 |
| 1.0 | 0.2 | 33 | 6 | | | | | | | |
| 1.5 | 0.5 | 33 | 11 | } [1] 41.8 | ------ | 32,500 | 16 | 1880 | 100 | } 5 6 |
| 1.5 | 0.5 | 31 | 14 | | | | | | | |
| 1.5 | 0.5 | 29 | 7 | } 34.3 | 13.6 | 59,300 | 51 | 3845 | 340 | } 7 8 |
| 1.5 | 0.5 | 29 | 7 | | | | | | | |

[1] The resinous and rubbery polymers were worked up together and no separation made, the entire product being treated as resin. In these bottles the contents were treated with isopropanol to coagulate the entire product, and the coagulum washed once with methanol.
[2] The contents of the bottles in the odd and even numbered runs were combined and worked up together, as indicated by the brackets. The reported yields are the yields of products obtained from the combined contents of the bottles.

EXAMPLE III

| | |
|---|---|
| Heptane | 250 ml. |
| Propylene | 25 g. |
| Sodium phenyl suspension (1 molar, in benzene) | 1.0–1.5 ml. (.001–.0015 mol, per Table III). |
| Aluminum - titanium - chlorine-preparation suspension. (Produced by reduction of TiCl$_4$ with metallic aluminum followed by intensive grinding. "AA" produced by the Stauffer Chemical Company—1 molar, suspended in mineral oil) | 2.0 ml. (.002 mol). |
| Tetrakis - (dimethylamino) silane suspension. (1 molar, in Shell Oil Company commercial heptane) | 1.0–1.5 ml. (.001–.0015 mol, per Table III). |

A series of runs was made in accordance with the foregoing recipe, varying the ingredients from run to run as set forth hereinafter in Table III. In each run the heptane was charged into a 28-ounce beverage bottle, which was then flushed with nitrogen and sealed with a neoprene-lined crown cap provided with a perforation for the hypodermic injection of reactants. The bottle was then inverted and placed in a cradle on a balance which was first brought to equilibrium and then overweighted with a 25-gram weight. Propylene was injected through a conduit and hypodermic needle until the balance was in equilibrium. The back pressure at this point was about 40 p.s.i.g. The suspensions of aluminum-titanium-chlorine composition and tetrakis-(dimethylamino) silane were hypodermically injected and the bottle placed on a polymerizer wheel operating in a water bath at 50° C. for two hours. At the end of this time the sodium phenyl was hypodermically injected except in the case of one of the runs (No. 8 in Table III) and the bottle replaced on the wheel and revolved for a further 40 hours in the 50° C. water bath. Pressures in the bottle were determined at 16 hours and 40 hours after injection of the sodium phenyl by means of a hypodermic gauge. At the end of 64 hours the bottles were vented, cooled and opened, and the polymers therein worked up as described in Example I. Set forth herewith in Table III are particulars of the several runs, together with the properties of the resultant products.

Plaques were pressed out in a laboratory press from each of the resinous products made in the runs described above. All plaques were white, opaque and tough.

EXAMPLE IV

| | |
|---|---|
| Heptane | 250 ml. |
| Propylene | 25 g. |
| Sodium phenyl suspension (0.878 molar, in benzene) | 1.14–2.28 ml. (.001–.002 mol, per Table IV). |
| Aluminum - titanium - chlorine-preparation suspension. (Produced by reduction of TiCl$_4$ with metallic aluminum followed by intensive grinding. "AA" produced by the Stauffer Chemical Compony—1 molar, suspended in mineral oil) | 2.0 ml. (.002 mol). |
| Tetrakis - (dimethylamino silane suspension. (1 molar, in Shell Oil Company commercial heptane) | 1.0–1.5 ml. (.001–.0015 mol, per Table IV) |

A series of runs was made in accordance with the foregoing recipe, varying the ingredients from run to run as set forth hereinafter in Table IV. In each run the heptane was charged into a 28-ounce beverage bottle, which was then flushed with nitrogen and sealed with a neoprene-lined crown cap provided with a perforation for the hypodermic injection of reactants. The bottle was then inverted and placed in a cradle on a balance which was first brought to equilibrium and then overweighted with a 25-gram weight. Propylene was injected through a conduit and hypodermic needle until the balance was in equilibrium. The back pressure at this point was about 40 p.s.i.g. The suspensions of aluminum-titanium-chlorine and tetrakis-(dimethylamino) silane were then hypodermically injected and the bottles placed on a polymerizer wheel which revolved and dipped in a water bath at 70° C. for 17 hours. At this time the sodium phenyl suspension, in the the amount selected for the run, was hypodermically injected and the bottles replaced upon the wheel and revolved in the bath at 70° C. for an additional 100 hours. Pressures were taken by means of hypodermic gauge at 23 hours and 95 hours after injection of the sodium phenyl. At the end of this time the polymers were recovered as described in Example I. Following are particulars of the runs, together with the properties of the products.

TABLE III

| Catalyst Ingredients (Millimols) | | Pressure in Bottle (p.s.i.g.) after | | Yield [1] (grams) | | Properties of the Resin | | | | Run No. |
|---|---|---|---|---|---|---|---|---|---|---|
| Na phenyl | Si[N(CH$_3$)$_2$]$_4$ | 16 hrs. | 40 hrs. | Resin | Rubber | Bending Modulus (p.s.i.) | Rockwell R Hardness | Tensile Strength | Elongation (percent) | |
| 1.0 | 1.0 | 40 | 26 | } 34 | 9.3 | 78,500 | 69 | 4506 | 443 | { 1 |
| 1.0 | 1.0 | 30 | 15 | | | | | | | 2 |
| 1.0 | 1.5 | 31 | 18 | 17.5 | 4.0 | 79,000 | 67 | 4900 | 473 | 3 |
| 1.5 | 1.0 | 36 | 20 | } 35 | 9.8 | 78,800 | 64 | 4525 | 448 | { 4 |
| 1.5 | 1.0 | 28 | 12 | | | | | | | 5 |
| 1.5 | 1.5 | 29 | 15 | } 32 | 8.9 | 82,900 | 72 | 4400 | 457 | { 6 |
| 1.5 | 1.5 | 36 | 25 | | | | | | | 7 |
| 1.5 | 1.5 | 66 | [2] 60 | 17.2 | 2.3 | 95,000 | 77 | 4100 | 534 | 8 |

[1] The contents of the bottles embraced by the brackets were combined and worked up together. The reported yields are the yields of products obtained from the combined contents of the bottles.
[2] The addition of the sodium phenyl suspension was withheld in this run until after the second reading of pressure at 40 hours after the start of the run.

TABLE IV

| Catalyst Ingredients (Millimols) | | Pressure in Bottle (p.s.i.g.) after— | | Yield [1] (grams) | | Properties of the Resin | | Run No. |
|---|---|---|---|---|---|---|---|---|
| Na phenyl | Si[N(CH$_3$)$_2$]$_4$ | 23 hrs. | 95 hrs. | Resin | Rubber | Bending Modulus (p.s.i.) | Rockwell R Hardness | |
| 1.0 | 1.5 | 29 | 25 | } 23.1 | 5.2 | 127,300 | 90 | { 1 |
| 1.0 | 1.5 | 34 | 32 | | | | | 2 |
| 1.5 | 1.5 | 25 | 20 | } 33.4 | 7.5 | 115,500 | 87 | { 3 |
| 1.5 | 1.5 | 17 | 9 | | | | | 4 |
| 2.0 | 1.5 | 11 | 3 | } 36.3 | 10.1 | 111,300 | 88 | { 5 |
| 2.0 | 1.5 | 12 | 9 | | | | | 6 |

[1] The contents of the bottles in the odd- and even-numbered runs were combined and worked up together, as indicated by the brackets. The reported yields are the yields of products obtained from the combined contents of the bottles.

EXAMPLE V

| | |
|---|---|
| Heptane | 250 ml. |
| Propylene | 25 g. |
| Sodium phenyl suspension (1 molar, in benzene) | 1.0–1.5 ml. (.001–.0015 mol, per Table V). |
| Aluminum-titanium-chlorine preparation suspension. (Produced by reduction of TiCl$_4$ with metallic aluminum followed by intensive grinding. "AA," produced by the Stauffer Chemical Company—1 molar, suspended in mineral oil) | 2.0 ml. (.002 mol). |
| Tetrakis-(dimethylamino) silane suspension. (1 molar, in Shell Oil Company commercial heptane) | 0.5–2.0 ml. (.0005–.002 mol, per Table V). |

A series of runs was made in accordance with the foregoing recipe, varying the ingredients from run to run as set forth hereinafter in Table V. In each run the heptane was charged into a 28-ounce beverage bottle, which was then flushed with nitrogen and sealed with a neoprene-lined crown cap provided with a perforation for the hypodermic injection of reactants. The bottle was then inverted and placed in a cradle on a balance which was first brought to equilibrium and then overweighted with a 25-gram weight. Propylene was injected through a conduit and hypodermic needle until the balance was in equilibrium. The back pressure at this point was about 30 p.s.i.g. The suspensions of aluminum-titanium-chlorine composition and tetrakis-(dimethylamino) silane were injected hypodermically and the bottle placed on a polymerizer wheel revolving in a water bath at 50° C. for 60 hours. At the end of this time the sodium phenyl suspension was injected and the bottle revolved for an additional 48 hours in the bath at 50° C. Pressure readings were taken hypodermically at 6 and 22 hours after the injection of the sodium phenyl. At the conclusion of the 48 hours the bottle was removed and the polymer recovered as described in Example I. Following are particulars of the several runs.

EXAMPLE VI

| | |
|---|---|
| Heptane | 250 ml. |
| Propylene | 25 grams. |
| Sodium phenyl suspension (1 molar in benzene) | 1.0 ml. (.001 mol). |
| Tetrakis (dimethylamino) silane solution (1 molar in Shell Oil Company's commercial heptane) | 3.0 ml. (.003 mol). |
| Aluminum-titanium-chlorine preparation suspension. (Produced by reduction of TiCl$_4$ with metallic aluminum followed by intensive grinding. "AA" produced by Stauffer Chemical Company—1 molar suspension, in mineral oil) | 2.0 ml. (.002 mol). |

A series of runs was made in accordance with the foregoing recipe, varying the ingredients from run to run as set forth hereinbelow in Table VI. In each run the heptane and propylene were charged into a polymerization bottle as described in Example I, thereafter all of the remaining ingredients except the aluminum-titanium-chlorine preparation suspension were hypodermically injected. Certain of the bottles, indicated in the table as having been "pre-reacted" were revolved on a polymerizer wheel at 50° C. for 2 hours, and threafter the aluminum-titanium-chlorine preparation was injected. In case of the other bottles, the aluminum-titanium-chlorine preparation was injected immediately without pre-reaction. In either case each individual bottle, after injection with the aluminum-titanium-chlorine preparation, was placed on a polymerizer wheel and revolved at 50° C. for 17 hours. At the end of this time the pressure in the bottle was hypodermically measured and the bottle opened and the polymer worked us as described in Example I. Set forth herewith in Table VI are particulars of the several runs.

TABLE V

| Catalyst Ingredients (Millimols) | | Pressure in Bottle (p.s.i.g.) after— | | Yield (grams) | | Properties of the Resin | | Run No. |
|---|---|---|---|---|---|---|---|---|
| Na phenyl | Si[N(CH$_3$)$_2$]$_4$ | 6 hrs. | 22 hrs. | Resin | Rubber | Bending Modulus (p.s.i.) | Rockwell R Hardness | |
| 1.0 | 0.5 | 35 | 11 | 14.4 | 10.0 | 45,800 | 43 | 1 |
| 1.0 | 1.0 | 39 | 17 | 15.6 | 7.0 | 64,200 | 59 | 2 |
| 1.0 | 2.0 | 35 | 16 | 17.8 | 5.7 | 84,900 | 79 | 3 |
| 1.5 | 0.5 | 35 | 10 | 18.4 | 8.8 | 49,900 | 45 | 4 |
| 1.5 | 1.0 | 40 | 17 | 16.7 | 3.9 | 71,500 | 67 | 5 |
| 1.5 | 1.5 | 36 | 15 | 18.4 | 6.5 | 81,300 | 75 | 6 |
| 1.5 | 2.0 | 32 | 16 | 18.0 | 8.6 | 92,500 | 79 | 7 |
| 2.0 | 1.0 | 37 | 16 | 19.0 | 7.0 | 72,500 | 65 | 8 |
| 2.0 | 1.5 | 36 | 13 | 18.8 | 6.5 | 80,600 | 73 | 9 |

TABLE VI

| Prereaction | Pressure at 17 hrs. (p.s.i.g.) | Yield (grams) | | Run No. |
| --- | --- | --- | --- | --- |
| | | Resin | Rubber | |
| Yes | 0 | 21.2 | 4.1 | 1 |
| None | 7 | 19.3 | 1.5 | 2 |
| None | 0 | 18.7 | 4.6 | 3 |

EXAMPLE VII

| | |
| --- | --- |
| Heptane | 250 ml. |
| Propylene | 25 grams. |
| Metallic sodium suspension (2 molar, in mineral oil) | 1 ml. (.002 mol). |
| Tetrakis(dimethylamino) silane solution (1 molar in Shell Oil Company's commercial heptane) | 2.0 ml. (.002 mol). |
| Aluminum-titanium-chlorine preparation suspension. (Produced by reduction of $TiCl_4$ with metallic aluminum followed by intensive grinding. "AA" produced by Stauffer Chemical Company—1 molar suspension, in mineral oil) | 2.0 ml. (.002 mol). |

The heptane and propylene were charged and sealed into a polymerizer bottle as described in the preceding examples. Thereafter the sodium suspension, tetrakis-(dimethylamino) silane solution and aluminum-titanium-chlorine preparation suspension were injected in that order. The bottle was placed on a polymerizer wheel at 50° C. for 88 hours. At the end of this time the pressure in the bottle had dropped to 18 p.s.i.g., and the contents of the bottle were worked up as described in the preceding examples. There were obtained 16.2 grams of resin and 2.2 grams of rubber.

EXAMPLE VIII

| | |
| --- | --- |
| Heptane | 250 ml. |
| Propylene | 25 grams. |
| Sodium phenyl suspension (1 molar, in benzene) | 1.0 ml. (.001 mol). |
| Tetrakis(dimethylamino) silane solution. (1.0 molar in Shell Oil Company's commercial heptane) | 3.0 ml. (.003 mol). |
| Aluminum-titanium-chlorine preparation suspension. (Produced by reduction of $TiCl_4$ with metallic aluminum followed by intensive grinding. "AA" produced by Stauffer Chemical Company—1 molar suspended in mineral oil) | 2.0 ml. (.002 mol). |

A series of runs was made, using the ingredients set forth in the preceding recipe, but varying the order of the addition of ingredients and also the time of pre-reaction thereof. In one bottle (Run No. 1 in Table VII) the heptane and propylene were charged and sealed into a polymerizer bottle as described in the preceding examples, the aluminum-titanium-chlorine preparation and tetrakis(dimethylamino) silane solution added next, and the bottle pre-reacted on a polymerization wheel at 50° C. for 2 hours, after which the sodium phenyl suspension was injected and the bottle replaced on the wheel for an additional 41 hours. In the second bottle, heptane was sealed into a polymerization bottle as described in the preceding example, but the propylene was withheld initially. The sodium phenyl and aluminum-titanium-chlorine preparation suspension were hypodermically injected, and the bottle pre-reacted on a polymerizer wheel at 50° C. for 2 hours, after which the tetrakis(dimethylamino) silane and propylene were hypodermically injected into the bottle and replaced on the polymerization wheel for 41 hours. The third bottle was run exactly like the second bottle, except that the pre-reaction on the wheel before the addition of the tetrakis(dimethylamino) silane and propylene was omitted. Pressures were taken on all bottles at 17 hours and 41 hours on the wheel and the bottles thereafter vented and the contents worked up as described in the preceding examples. Set forth herewith in Table VII are particulars of the several runs.

TABLE VII

| Order of Addition of Reactants | Prereaction | Pressures (p.s.i.g.) at— | | Yield (grams) | | Run No. |
| --- | --- | --- | --- | --- | --- | --- |
| | | 17 hrs. | 41 hrs. | Resin | Rubber | |
| Propylene, $Ti_3AlCl_{12}$ silane, Na-phenyl | Yes | 29 | 18 | 15.6 | 3.2 | 1 |
| Na-phenyl, $Ti_3AlCl_{12}$, silane, propylene | do | 16 | 7 | 21.2 | 3.4 | 2 |
| Do | None | 17 | 0 | 19.4 | 2.4 | 3 |

EXAMPLE IX

| | |
| --- | --- |
| Heptane | 250 ml. |
| Propylene | 25 g. |
| Sodium phenyl suspension (1 molar, in benzene) | 2.0 ml. (.002 mol). |
| Tetrakis-(dimethylamino) titanium solution. (1 molar, in Shell Oil Company's commercial heptane) | .62 ml. (.062 mol). |
| Tetrakis-(dimethylamino) silane solution. (1 molar, in Shell Oil Company commercial heptane) | 1.0 ml. (.001 mol). |
| Aluminum-titanium-chlorine preparation solution. (Produced by reduction of $TiCl_4$ with metallic aluminum followed by intensive grinding. "AA" produced by Stauffer Chemical Company—1 molar, suspended in mineral oil) | 2.0 ml. (.002 mol). |

The heptane was charged into a 28-ounce beverage bottle, which was then flushed with nitrogen and sealed with a neoprene-lined crown cap provided with a perforation for hypodermic injection of reactants. The bottle was then inverted and placed in a cradle on a balance which was first brought to equilibrium and then overweighted with a 25-gram weight. Propylene was injected through a conduit and hypodermic needle until the balance was at equilibrium. The tetrakis(dimethylamino) titanium and tetrakis-(dimethylamino) silane solutions and sodium phenyl and aluminum-titanium-chlorine preparation suspensions were next injected hypodermically, and the bottle placed upon a polymerizer wheel revolving in a water bath at 50° C. for 72 hours. At the end of this time the bottle was removed from the wheel, cooled to 25° C., vented and opened, and the polymer separated from the vehicle by decantation. The solid product was then reslurried in heptane, the slurry poured into methanol and the mixture agitated for 15 minutes. The slurry was then filtered and the solid resinous product removed from the filter and dried in open air for 24 hours. This product amounted to 18.8 grams, and samples molded therefrom showed a bending modulus of 118,900 p.s.i. and a Rockwell hardness of 82, R scale. A sample of the product was extracted with boiling heptane for 24 hours in the Soxhlet extractor; 96.0% of the sample remained undissolved.

The liquid decanted from the polymerizer mixture and the filtrate from the reslurrying operation was diluted with ethanol and then heated to drive off the volatile material, leaving a rubbery polymer amounting to 5.9 grams. This probably contained some of the oil introduced along with the catalytic ingredients.

From the foregoing general discussion and detailed experimental data, it will be evident that this invention provides a novel catalytic process, and novel catalysts, for the polymerization of olefinically unsaturated monomers to yield polymeric products of enhanced stereoregularity and crystallinity. The throughput and yield obtainable with the process and catalysts of the invention are substantially greater than corresponding results obtainable with comparable prior art catalysts.

What is claimed is:

1. A process of polymerizing propylene which comprises contacting the same with a catalyst comprising
   (A) A reducing agent selected from the group consisting of sodium metal and sodium hydrocarbons containing 1–40 carbon atoms
   (B) A halide of a group IV–A metal, and
   (C) A compound selected from the group consisting of tetrakis-(dihydrocarbonamino)silanes and hexakis-(dihydrocarbonamino)siloxanes in which the hydrocarbon groups attached to the nitrogen atoms contain 1–20 acrbon atoms the amount of the reducing agent (A) being .7–3.0 mols per gram-atom of the group IV–A metal in the halide (B), and the amount of the said selected compound (C) being sufficient to provide .01–5.0 gram-atoms of amino nitrogen per mol of the reducing agent (A).

2. Process according to claim 1, wherein the reducing agent (A) is sodium metal.

3. Process according to claim 1, wherein the reducing agent (A) is sodium phenyl.

4. Process according to claim 1, wherein the component (B) is the product of reduction of titanium tetrachloride by aluminum metal, said component having been subjected to intensive grinding.

5. Process according to claim 4, wherein the reducing agent (A) is sodium metal.

6. Process according to claim 4, wherein the reducing agent (A) is sodium phenyl.

7. A catalytic composition comprising
   (A) A reducing agent selected from the group consisting of sodium metal and sodium hydrocarbons containing 1–40 carbon atoms
   (B) A halide of a group IV–A metal, and
   (C) A compound selected from the group consisting of tetrakis-(dihydrocarbonamino)silanes and hexakis-(dihydrocarbonamino)siloxanes in which the hydrocarbon groups attached to the nitrogen atoms contain 1–20 carbon atoms the amount of the reducing agent (A) being .7–3.0 mols per gram-atom of the group IV–A metal in the halide (B), and the amount of the said selected compound (C) being sufficient to provide .01–5.0 gram-atoms of amino nitrogen per mol of the reducing agent (A).

8. A catalytic composition according to claim 7, wherein the reducing agent (A) is sodium metal.

9. A catalytic composition according to claim 7, wherein the reducing agent is sodium phenyl.

References Cited by the Examiner

UNITED STATES PATENTS

| | | | |
|---|---|---|---|
| 2,579,413 | 12/51 | Boyd | 260—429.5 |
| 2,807,635 | 9/57 | Breederveld et al. | 260—448.2 |
| 2,932,633 | 4/60 | Juveland et al. | 260—94.9 |
| 2,979,488 | 4/61 | Carpenter | 260—94.3 |
| 3,081,287 | 3/63 | Coover et al. | 260—93.7 |
| 3,088,940 | 5/63 | Jenkins | 260—88.7 |

FOREIGN PATENTS

| | | |
|---|---|---|
| 585,827 | 6/60 | Belgium. |
| 809,717 | 3/59 | Great Britain. |

OTHER REFERENCES

Chemical Reviews, Vol. 61, February 1961, page 19.

JOSEPH L. SCHOFER, *Primary Examiner.*

J. GOTTS, *Examiner.*